United States Patent [19]

Nelson et al.

[11] 3,942,646

[45] Mar. 9, 1976

[54] BICYCLE STAND

[75] Inventors: Edgar L. Nelson, Sacramento; James R. Espinola, Carmichael, both of Calif.

[73] Assignee: A. Teichert & Son, Inc., Sacramento, Calif.

[22] Filed: Mar. 7, 1975

[21] Appl. No.: 556,296

[52] U.S. Cl. .................. 211/5; 70/234; 211/20; 248/499
[51] Int. Cl.² .................. E05B 73/00; E05B 71/00
[58] Field of Search .......... 52/4, 23, 294; 70/57, 58, 70/61, 62, 233, 234, 235, 236; 211/4, 5, 17–24; 119/107, 118, 119; 248/203, 499; 105/466–473, 475, 476, 481, 483, 486

[56] References Cited
UNITED STATES PATENTS

| | | | |
|---|---|---|---|
| 1,439,226 | 12/1922 | Clarke | 52/4 X |
| 1,470,198 | 10/1923 | Miller et al. | 70/234 X |
| 1,705,381 | 3/1929 | Snyder | 105/472 X |
| 2,059,390 | 11/1936 | Pagel | 105/481 |
| 2,502,714 | 4/1950 | Garnett | 248/499 |
| 3,739,609 | 6/1973 | Kaufmann | 70/234 |
| 3,865,245 | 2/1975 | Lieb et al. | 70/234 |
| 3,865,246 | 2/1975 | Lieb et al. | 70/234 |
| 3,881,680 | 5/1975 | Lietaert | 70/234 |

FOREIGN PATENTS OR APPLICATIONS

| | | | |
|---|---|---|---|
| 88,377 | 1/1937 | Sweden | 211/22 |
| 1,010,530 | 6/1952 | France | 211/20 |
| 78,272 | 1/1955 | Netherlands | 211/20 |
| 15,756 | 11/1895 | United Kingdom | 211/17 |
| 8,448 | 3/1898 | United Kingdom | 211/22 |
| 361,590 | 11/1931 | United Kingdom | 211/18 |

*Primary Examiner*—Roy D. Frazier
*Assistant Examiner*—Lawrence J. Staab
*Attorney, Agent, or Firm*—Lothrop & West

[57] ABSTRACT

An elongated, cast concrete block including a top, bottom, two ends and two sides has a median, vertical, longitudinal slot formed therein for the retention of a bicycle wheel. A locking channel extends through the block from an opening on one end of the block to an opening on one side of the block. The channel is sloped and is lined with polyvinyl chloride pipe to afford a smooth, uninterrupted surface which, when aided by the force of gravity, facilitates the insertion of a bicycle locking chain, or cable, downwardly through the channel and out the other end so that a bicycle can readily be chained to the stand.

A reinforcing bar inside the concrete block at least partially encircles the pipe and thus "hardens" the installation against attempts to steal the bicycle by rupturing the concrete in the vicinity of the locking channel.

5 Claims, 5 Drawing Figures

BICYCLE STAND

BACKGROUND OF THE INVENTION

Both the market place and the patent literature provide examples of devices which not only support a bicycle in upright attitude but also serve as anchors to which the bicycle can be secured, as by a locked chain, cable or other high strength steel member.

Exemplary is the disclosure in U.S. Pat. No. 3,739,609 granted to Edward A. Kaufmann on June 19, 1973 for Bicycle Lock.

Another form of bicycle stand comprises an elongated concrete block with a median vertical slot to receive a bicycle wheel and retain the bicycle in vertical attitude. Cast into the block, usually at the end of the block adjacent the pedal sprocket, is the shank of an eye-bolt with the eye projecting outwardly from the block. In this form of device, the security chain, or cable, is anchored by threading it through the eye. While the eye-bolt construction makes it convenient to lead the chain therethrough, it has been found that from the security aspect, eye-bolts leave much to be desired. A long, heavy bar with one end passed through the eye and fulcrumed against the block often provides sufficient leverage to rupture the concrete gripping the shank and to withdraw the bolt from the block.

In another form of commercially available device, the stand again comprises an elongated block of concrete provided with a median, vertical slot to retain the bicycle wheel and hold the bike in upright posture. The locking chain is secured in a registering pair of horizontal holes on opposite sides of the vertical slot. While this construction permits the use of a short chain, it presents considerable difficulty in installing the chain since one end of the chain must first be threaded through one horizontal hole, thence through the spokes and finally through the opposite hole. Then, the other end of the chain must be passed through the spokes so that both ends of the chain can be brought together to receive the lock.

In addition to the foregoing, there are numerous other types of bicycle stands and racks to which a bicycle can be chained while being held in vertical position. However, there is still considerable room for improvement in the art.

SUMMARY OF THE INVENTION

The invention relates to improvements in bicycle stands of the type which hold bicycles in upright attitude and which also provide cooperating structure to which a bicycle can be quickly yet securely locked.

It is an especial object of the invention to provide a bicycle stand which is not only relatively economical to make and install but which is also convenient to use and unassailable against all but the most concerted attempts at destruction.

It is another object of the invention to provide a bicycle stand which is compact in size, yet strong and devoid of any protuberances and projections which tend to become the targets of mischievous or malicious wrongdoers and which do little to prevent destructive assaults by thieves.

It is a further object of the invention to provide a bicycle stand in which the locking chain structure is of an internal configuration rather than an external one, and which therefore is difficult to destroy.

It is another object of the invention to provide a generally improved bicycle stand.

Other objects, together with the foregoing, are attained in the embodiment described in the following description and illustrated in the accompanying drawing whose figures will now be described.

SHORT DESCRIPTION OF THE FIGURES

DETAILED DESCRIPTION OF PREFERRED EMBODIMENT

Figure 1:
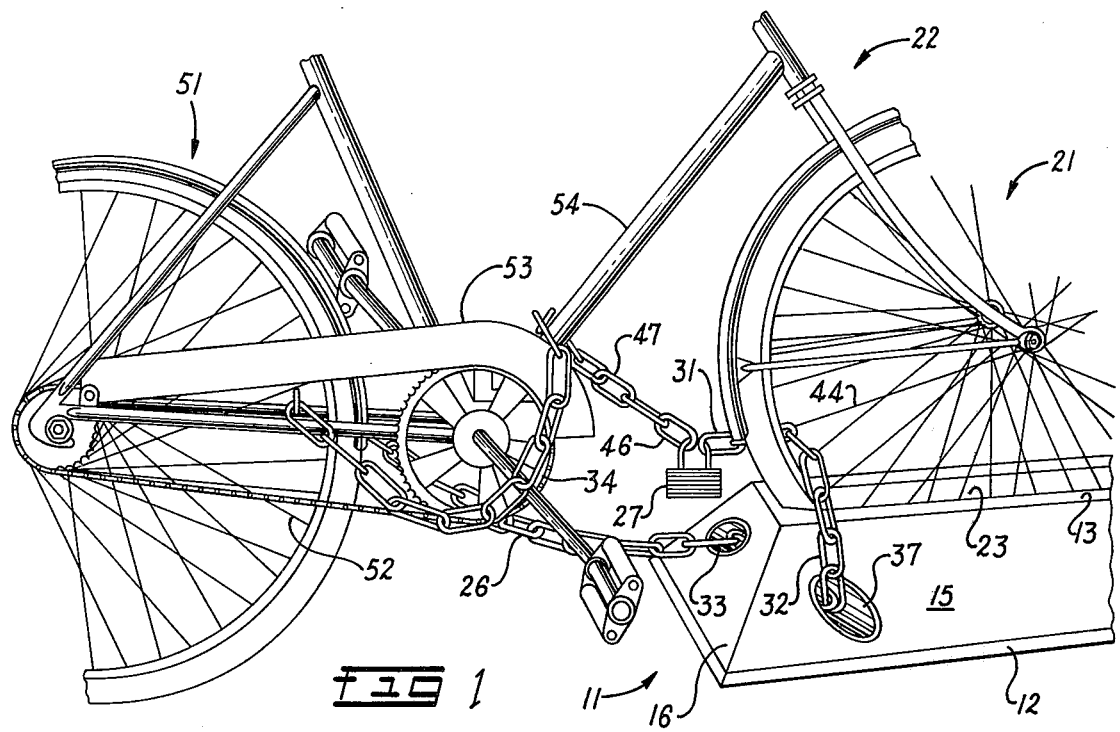
FIG. 1 is a fragmentary side elevational view of a preferred form of stand showing the front wheel of a bicycle located in a vertical wheel recess in the stand and illustrating the arrangement of the locking hole in which the locking chain is installed.
Figure 3:
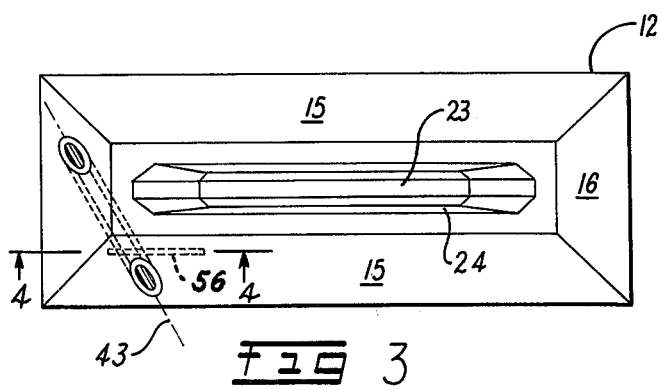
FIG. 3 is a top plan view.

While the bicycle stand of the invention is susceptible of numerous different physical embodiments, depending upon the environment and requirements of use, substantial numbers of the herein shown and described embodiment have been made and used and all have performed in an eminently satisfactory manner.

The bicycle stand of the invention, generally designated by the reference numeral 11, comprises an elongated block 12, preferably of cast concrete construction. The block includes a top 13, bottom 14, pair of sloping sides 15 and pair of sloped ends 16.

Figure 4:
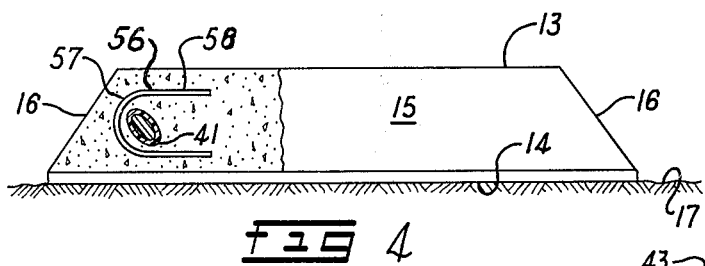
FIG. 4 is an elevational view of the side on which the lower end of the pipe emerges, portions being broken away to reveal interior details of the pipe and the reinforcing bar; and, FIG. 5 is an elevational view of the end in which the upper opening of the pipe is located.
Figure 2:
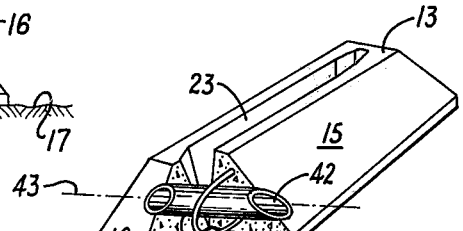
FIG. 2 is a perspective view with portions of the concrete block broken away to disclose the relation of the pipe liner and steel reinforcing bar embedded in the block.

As appears most clearly in FIG. 4, the bottom 14 of the block 12 is planar and is secured to a subjacent planar supporting surface 17 of asphalt, tile, concrete or the like, by a suitable adhesive such as an epoxy resin.

Ordinarily, although not necessarily, a battery of identical blocks would be arranged side to side to form a row. The width of each block in this event, is sufficient so that when a bicycle wheel, such as the front wheel 21 of the bicycle 22 shown in FIG. 1, is placed in the median, vertical, longitudinal slot 23 in the top 13 of the block, there is adequate clearance between the bicycle 22 and any adjacent bicycles similarly located in blocks (not-shown) on opposite sides of the block 12.

The wheel-retaining slot 23 is so configured and dimensioned that when the front wheel 21, for example, is inserted in the slot 23, the tire and rim portions of the wheel are snugly confined by the walls 24 of the slot. In this fashion, the front wheel 21 and the bike itself are securely held in an upright attitude, as shown.

After the bicycle is thus positioned in the stand, the rider can lock the bike to the stand, as by a chain 26 with lock 27.

Conveniently, one end link 31 of a relatively short length 32 of chain is inserted through an upper opening 33 in the end 16 of the block adjacent the pedal sprocket 34. The link 31 and following links of the short length 32 are then allowed to slide down a downwardly sloping channel 36 extending laterally and at a forward angle and terminating in an opening 37 in the side 15.

Figure 5:
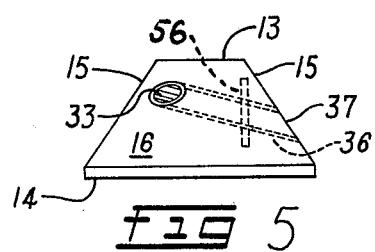

The channel 36, in other words, extends angularly across a corner of the block from the upper opening 33, located near the junction of the top 13 and the left-hand side wall 15 (see FIGS. 1 and 5), to the lower opening 37 in the right-hand side wall 15.

In order to facilitate the movement of the chain through the channel 36, the channel is lined with a pipe 41. Owing to the toughness, resistance to wear and smooth surface provided by polyvinyl chloride, this widely used "plastic" is the preferred material from which the pipe 41 is made.

The smooth, uninterrupted passageway 42 provided by the pipe 41, together with the force of gravity acting on the chain links as a result of the downward slope of the pipe axis 43, readily enables the chain to slide through the pipe and emerge from the lower opening 37 where the link 31 can be grasped and recurved backwardly through the spokes 44 of the front wheel 21, as shown in FIG. 1.

At this juncture, the link 46 at the other end of the chain can either be locked directly to the link 31 by the lock 27 or, preferably, as appears in FIG. 1, the link 46 and adjacent long bight portion 47 of the chain can be led to the rear wheel 51, inserted through the rear wheel spokes 52, thence forwardly over the chain guard 53 and frame member, such as the down tube 54, for engagement with the lock 27 and opposite end link 31. In this arrangement, the chain 26 not only locks the front and rear wheels but the frame itself.

It is to be noted that with the inclined channel and PVC pipe construction heretofore described, the surface of the block is entirely devoid of protuberances. The only discontinuities in the side wall and the end wall are the respective openings 37 and 33, neither of which affords a convenient point of attack by a hammer blow or a prybar.

In the event an effort were to be made to destroy the mass of concrete enclosing the channel and pipe liner, as by inserting a bar into the passageway and prying upwardly or rearwardly, the effort would be resisted by the strength of a reinforcing bar 56 embedded in the block at the time of casting.

As appears most clearly in FIGS. 2 – 5, the reinforcing bar 56 at least partially encircles the pipe over the arcuate portion 57 and is of sufficient diameter, strength and length of leg 58 so as to resist all but the most violent assaults on the concrete mass protecting the channel and PVC pipe structure.

It can therefore be seen that we have provided a bicycle supporting stand which is not only compact, streamlined and virtually destruction-proof, but which also utilizes the force of gravity in conjunction with an uninterrupted smooth-walled passageway to facilitate the installation of a bicycle security chain.

What is claimed is:

1. A bicycle stand comprising:
    a. an elongated block of concrete having a bottom, a top, a forward end and an after end, and two sides, said top having formed therein an elongated recess capable of snugly receiving and maintaining a bicycle wheel in upright attitude;
    b. a locking channel formed in said block, said channel extending from one opening located on the surface of said after end to another opening located on the surface of one of said sides, said locking channel being inclined at a predetermined slope so that a lock chain inserted downwardly through said one opening of said channel toward said other opening of said channel is at least partially assisted in its movement through said channel by the force of gravity,
    the interior walls of said channel being smooth and uninterrupted to facilitate the movement of a lock chain therethrough.

2. A bicycle stand as in claim 1 in which said channel is lined with pipe.

3. A bicycle stand as in claim 2 in which the material of said pipe is polyvinyl chloride.

4. A bicycle stand as in claim 3 including a reinforcing bar at least partially encircling said pipe.

5. A bicycle stand as in claim 4 in which said bottom is planar to provide maximum contact area for attachment of said block to a supporting surface.

* * * * *